(12) United States Patent
Ferrari et al.

(10) Patent No.: US 9,827,817 B2
(45) Date of Patent: Nov. 28, 2017

(54) TIRE CHANGING MACHINE

(71) Applicants: Gino Ferrari, Correggio (IT); Franco Maioli, Correggio (IT)

(72) Inventors: Gino Ferrari, Correggio (IT); Franco Maioli, Correggio (IT)

( * ) Notice: Subject to any disclaimer, the term of this patent is extended or adjusted under 35 U.S.C. 154(b) by 0 days.

(21) Appl. No.: 15/307,767

(22) PCT Filed: May 7, 2015

(86) PCT No.: PCT/IB2015/053324
§ 371 (c)(1),
(2) Date: Oct. 28, 2016

(87) PCT Pub. No.: WO2015/170272
PCT Pub. Date: Nov. 12, 2015

(65) Prior Publication Data
US 2017/0066295 A1    Mar. 9, 2017

(30) Foreign Application Priority Data

May 7, 2014   (IT) .............................. MO2014A0124

(51) Int. Cl.
*B60C 25/05*   (2006.01)
*B60C 25/138*  (2006.01)
*B60C 25/02*   (2006.01)
*B60C 25/132*  (2006.01)

(52) U.S. Cl.
CPC ........ *B60C 25/0527* (2013.01); *B60C 25/138* (2013.01); *B60C 25/02* (2013.01); *B60C 25/132* (2013.01)

(58) Field of Classification Search
CPC ... B60C 25/0527; B60C 25/138; B60C 25/02; B60C 25/025; B60C 25/132; B60C 25/04

USPC .......................... 157/1.17, 1.24–1.28, 19, 20
See application file for complete search history.

(56) References Cited

U.S. PATENT DOCUMENTS

| 4,209,053 A | * | 6/1980 | du Quesne | B60C 25/132 |
| | | | | 157/1.24 |
| 4,210,190 A | * | 7/1980 | Hessels | B60B 30/06 |
| | | | | 157/1.24 |
| 4,884,611 A | * | 12/1989 | Schmidt | B60B 30/06 |
| | | | | 157/1.17 |
| 5,325,903 A | * | 7/1994 | du Quesne | B60C 25/132 |
| | | | | 157/1.24 |

(Continued)

FOREIGN PATENT DOCUMENTS

DE          4006037          8/1991

*Primary Examiner* — Larry E Waggle, Jr.
*Assistant Examiner* — Danny Hong
(74) *Attorney, Agent, or Firm* — Themis Law

(57) ABSTRACT

A tire changing machine includes a base having a pedal-operated control system located on one side, a rotating platform which defines a surface upon which wheels of vehicles can be fixed, and which is supported by the base, a column rising from the base, an operating arm hinged to an upper area of the column, which can be oriented in a plane transverse to the column and parallel to the plane of the platform, between a work position facing the platform and an opposite rest position facing away from the platform and having a hinging end and an opposite end having a connection for a device holding work tools, a selector unit being interposed between the hinging end and the column, for selecting an orientation of the operating arm in its work position.

5 Claims, 4 Drawing Sheets

(56) References Cited

U.S. PATENT DOCUMENTS

| | | | |
|---|---|---|---|
| 5,472,034 A | 12/1995 | Corghi | |
| 6,056,034 A * | 5/2000 | Matnick | B60C 25/138 157/1.17 |
| 7,343,955 B2 * | 3/2008 | Cunningham | B60C 25/135 157/1.17 |
| 8,746,317 B2 * | 6/2014 | Barbetti | B60C 25/138 157/1.17 |
| 2001/0000391 A1 * | 4/2001 | Kane | B60C 25/0515 157/1.24 |
| 2002/0046814 A1 * | 4/2002 | Vignoli | B60C 25/138 157/1.28 |
| 2012/0298313 A1 | 11/2012 | Barbetti | |

* cited by examiner

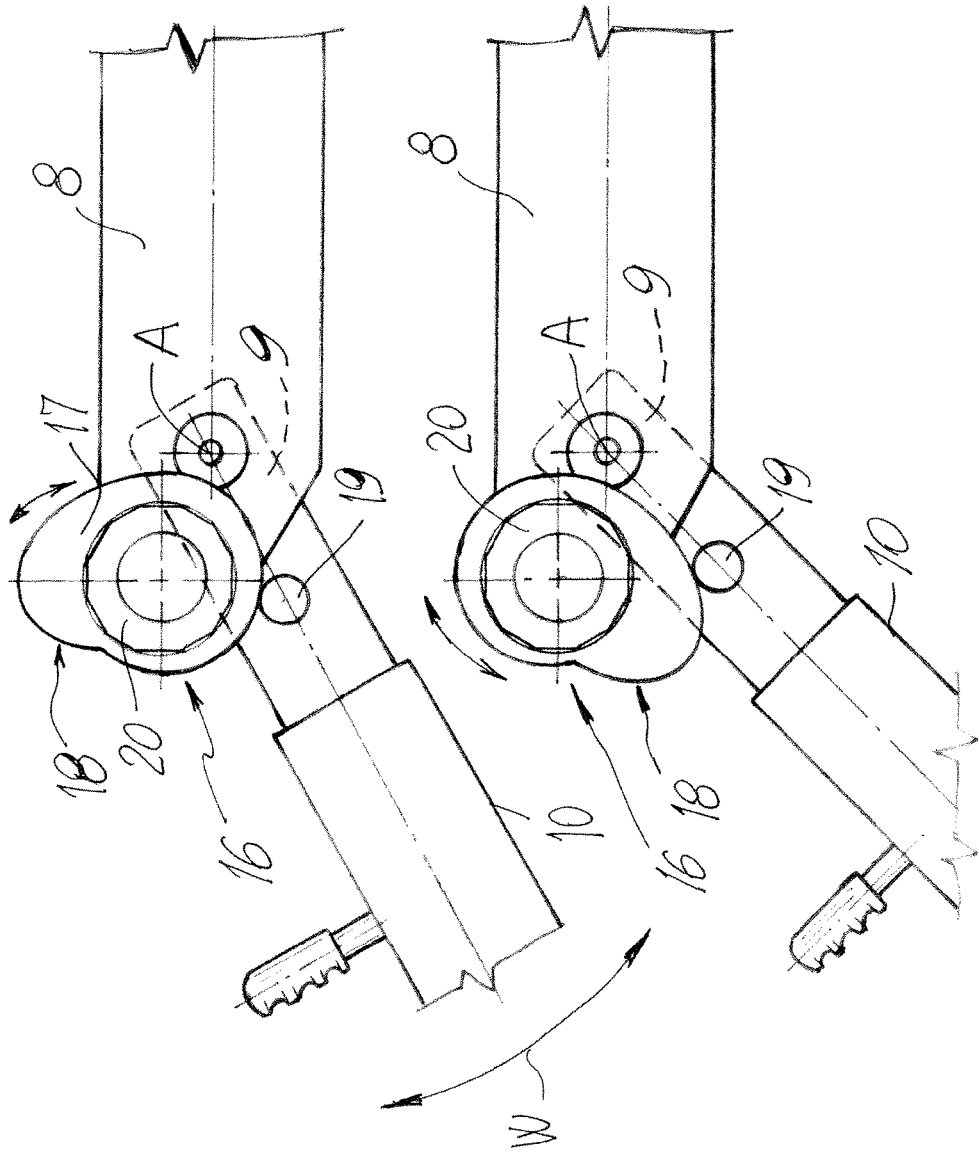

TIRE CHANGING MACHINE

FIELD OF THE INVENTION

The invention relates to a tire changing machine, particularly a tire changing machine having a selector device for accurately and repetitively orienting its operating arm, thereby ensuring that the selected orientation allows a work tool to be always accurately positioned in a predetermined contact area between a tire bead and the edge of the rim of a wheel upon which it is mounted, without damaging the rim.

BACKGROUND ART

A tire changing machine is known to comprise a base, typically having the shape of a parallelepiped, and having a horizontal platform mounted thereupon, which is adapted to be rotatably actuated and to receive the wheels of a vehicle lying thereupon, and locked by appropriate lock devices, in a typically horizontal position, for tire mounting and demounting. Conventional pedals are placed on a front side of the base, for controlling the functions of the tire changing machine, and a tool-holding column rises from an opposite rear side of the base and has a hinge connection at its top, for a proximal column-facing end of a horizontal operating arm which pivots in cantilevered fashion in a rotation plane parallel to the platform. The operating arm in turn supports, at its opposite distal end, an additional connection in the form of a vertical sleeve, in which a rod having a polygonal section is slidably and non-rotatably coupled, which rod has a connection at the base-facing bottom end, for interchangeably attaching a set of work tools, to be used for mounting and demounting tires to and from respective rims of vehicle wheels. As mentioned above, the operating arm can pivot in cantilevered fashion and may be rotatably actuated either by a manual action of the tire repairer or by means of a fluid-dynamic actuator, which is placed between the arm and the top of the tool-holding column and is actuated by the special pedal control operated by the tire repairer: the operating arm is actually displaceable between a work position in which it is rotated toward the platform and a rest position in which it is laterally moved away from the platform, typically toward the right side of the front work position of the tire repairer with respect to the base. During the process of demounting or mounting the tire from or to its rim, the operating arm is pivoted into the work position relative to the tool-holding column through an angle whose amplitude is determined by the diameter of the rim and the corresponding tire, for accurate vertical alignment of the rod and especially the work tool supported thereby at the bottom end, typically a debeader, on the selected point of contact with the tire bead, which is typically sealingly placed against the edge of the rim, for removing it from the latter, without touching it to avoid damages. Therefore, the orientation of the operating arm is a critical step of the tire demounting or mounting process and requires accuracy and precision on the part of the tire repairer. These orientation and displacement steps shall be further repeated for each wheel that has to undergo tire demounting or mounting, and each time alignment must be repeated by the tire repairer with the utmost precision.

This prior art suffers from certain drawbacks.

A first drawback is that accurate orientation of the operating arm into the work position is typically a question of skill of the tire repairer, and since this operation is typically repeated many times in a work-day, tire repairers, in spite of their familiarity with it, tend to perform it in routine fashion and as quick as possible, thereby neglecting accuracy in orienting the operating arm. For this reason, during debeading, any accidental contact between the edges and the work tools held by the operating arm, due to inaccurate orientation of the operating arm, will cause damages to the edges of the rims.

A second drawback is that proper orientation of the operating arm must be repeated, even considering the difference in wheel diameters, and this step requires each time a considerably long operating time, which will be multiplied by all the wheels to be treated by tire repairers in a work-day, and becomes a remarkably long time, during which no demounting or mounting can be performed, leading to a reduction of the overall number of demounting and mounting operations, and hence of the earnings resulting therefrom.

A third drawback is that, even when tire repairers mount and demount tires to and from a set of wheels having the same diameter, e.g. the wheels of a single vehicle, they shall repeat the step of orienting the operating arm into the work and displaced positions for each of them, which leads to the above mentioned drawbacks.

A fourth drawback is that, during debeading and mounting, the tire repairer is required to hold the wheel and manipulate and position it as needed and, at the same time, to control the functions of the tire changing machine with the feet to operate the pedals located on the front side of the base. It shall be noted in this respect that the tire repairer is typically obliged to work in a lateral position relative to the expected front work position, due to the presence of the operating arm projecting out of the right side of the tire changing machine. This will affect convenient operation of pedals located on the front side of the base, and the tire repairer is thus required to assume unnatural and forced positions to perform all the actions required for tire demounting and mounting.

A fifth drawback is that certain tires have very rigid beads and debeading becomes difficult and laborious for tire repairers, who will have to manually bend the beads to introduce the lever that is usually employed to lift a portion thereof between the latter and the rim edges for the debeading tool supplied with the tire changing machine to be later introduced into that portion.

DISCLOSURE OF THE INVENTION

One object of the present invention is to improve the state of the prior art. Another object of the invention is to provide a tire changing machine which is equipped with a selector device that allows repetitive orientation of its operating arm into a selected position in quick and error-free fashion.

A further object of the invention is to provide a tire changing machine comprising a selector device for repetitively orienting its operating arm, that is simple and inexpensive and has an intuitive operation.

Yet another object of the invention is to make the work of tire repairers easier, less laborious and ergonomically correct, especially in actuating the functions of a tire changing machine.

In one aspect the invention provides a tire changing machine as defined in the features of claim 1.

The dependent claims provide a preferred embodiment of the features of the invention.

The invention affords the following advantages:
- repetitively orienting the operating arm of a tire changing machine into a selected work position in quick and error-free fashion;
- changing the selection of the work position of the operating arm of a tire changing machine according to the diameters of vehicle wheels;
- reducing the time required for demounting and mounting tires from and to the rims of vehicle wheels;
- making the work of tire repairers easier, more convenient and more ergonomically correct.

BRIEF DESCRIPTION OF THE DRAWINGS

Further characteristics and advantages of the invention will be more apparent from the detailed description of a preferred, non-exclusive embodiment of a tire changing machine, which is shown as non-limiting example in the annexed drawings, in which:

FIG. 3 is an enlarged detail view of a selector unit for selecting an orientation of the operating arm, in a first selected work position;

FIG. 4 is an enlarged detail view of a selector unit for selecting an orientation of the operating arm, in a second selected work position;

DETAILED DESCRIPTION OF A PREFERRED EMBODIMENT

Figure 5:
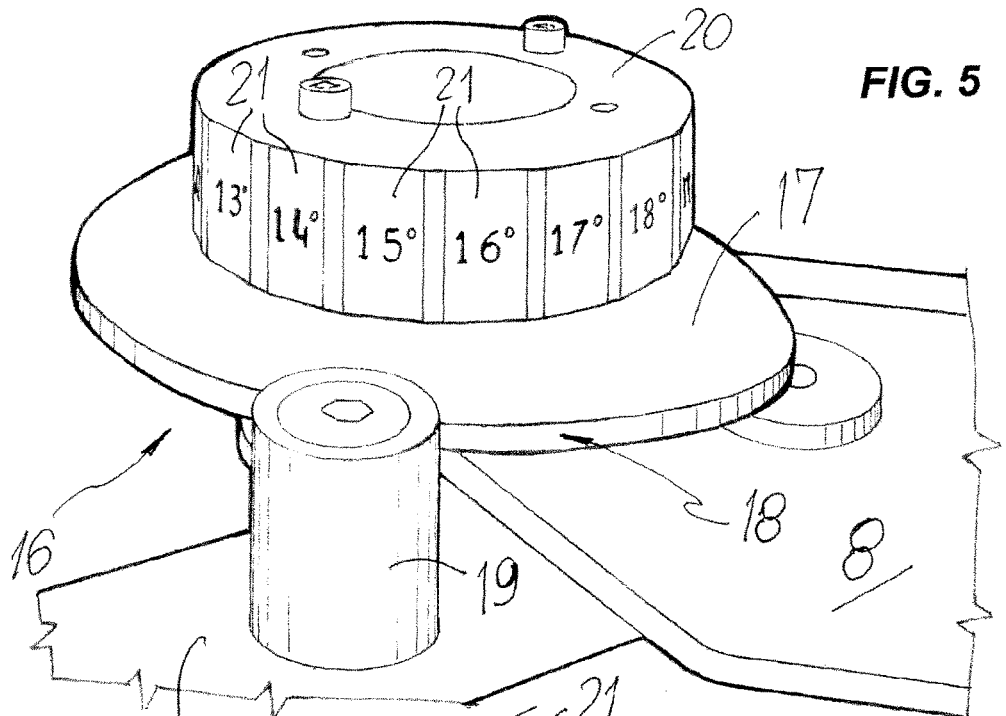
FIG. 5 is a broken-away detailed view of a detail of a selector unit mounted to the tire demounting machine of FIG. 1.
Figure 6:
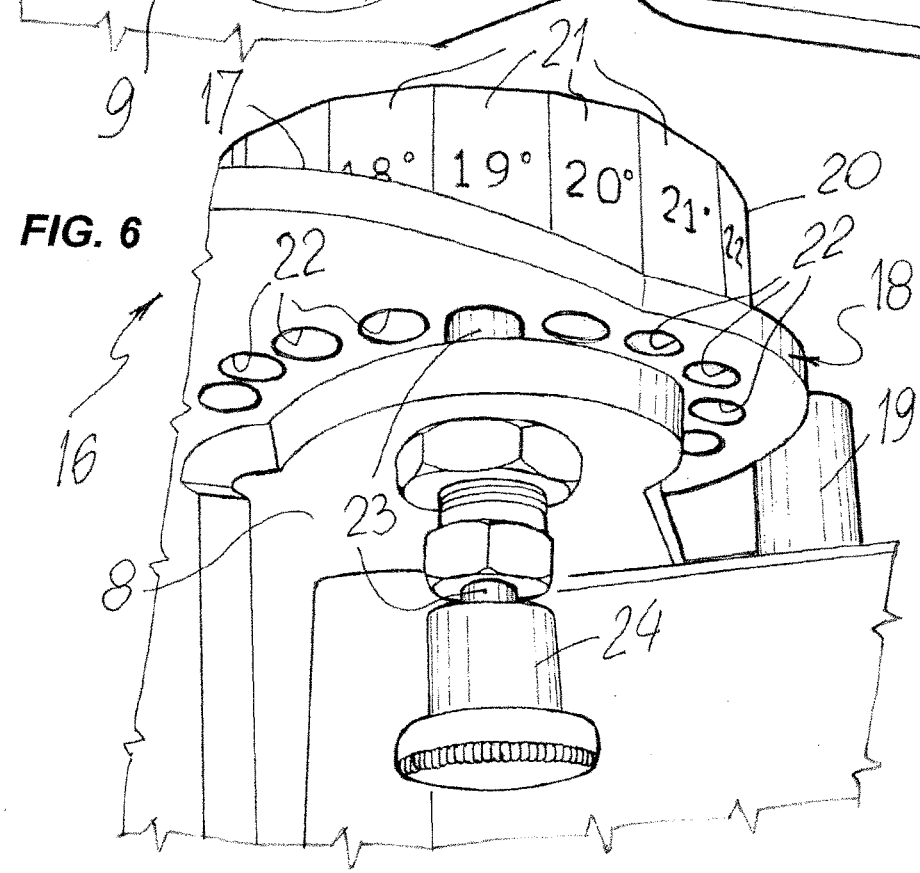
FIG. 6 is a bottom broken-away detailed view of the selector unit of FIG. 5.

Referring to the above mentioned figures, numeral 1 generally designates a tire changing machine, which comprises a base 2 having a platform 3 supported thereon, which defines a plane 4 for vehicle wheels 5 to be laid and secured thereon for demounting and mounting of tires from and to their respective rims. A substantially vertical column 6 rises from the rear of the base 2, referenced 2A, and has a C-shaped flange at its top, with the proximal end 9 of an operating arm hinged between the C wings, the arm supporting, at the opposite end 11, a vertical sleeve 12 that slidably receives a rod 13 therein, the latter having at its bottom end a connection 1 for a set of interchangeable work tools 15. The proximal end 9 is hinged to the flange 8 with a vertical hinge axis "A", such that the operating arm 10 can rotate in cantilevered fashion in the direction of arrows "W" in a rotation plane parallel to the plane 4, from a work position in which it is rotated toward the platform 3 to a rest position in which it is rotated away from the platform 3, and vice versa. A selector unit 16 for selecting an orientation of the operating arm 10 in a work position is mounted on the flange 8. The selector unit 16 comprises a contact element 17 which peripherally defines an eccentric contact profile, typically a plate with a cam-shaped perimeter 18, which is designed to be rotated to positions that can be selected by defining selectable contact points. The contact element 17 is mounted to the flange 8 to be able to rotate stepwise relative to the latter. The selector unit 16 further comprises a stationary stop element, typically a peg 19, which is mounted with a perpendicular orientation to the end 9 of the operating arm 10 to project therefrom upwards until it contacts the cam profile 18 and abut the latter in a selected contact point, as better explained hereinafter. In order to set a selected contact point, a knob 20 is mounted to the top face of the contact element 17, to be rotatably joined with the contact element 17, and has reference values, e.g. degrees, marked thereon, e.g. on corresponding peripheral faces 21 of the knob 20, as shown in greater detail in FIGS. 5 and 6.

Figure 7:
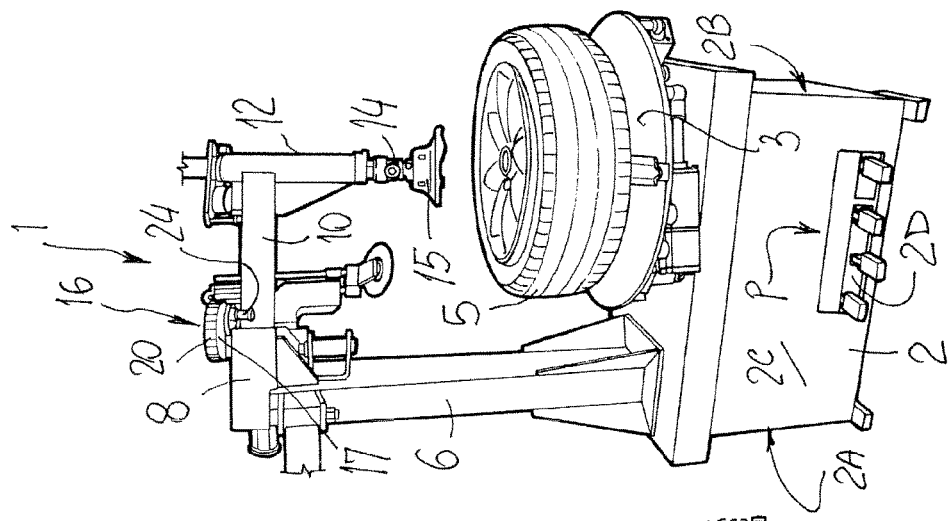
FIG. 7 is a lateral view of an tire changing machine of the invention.
Figure 2:
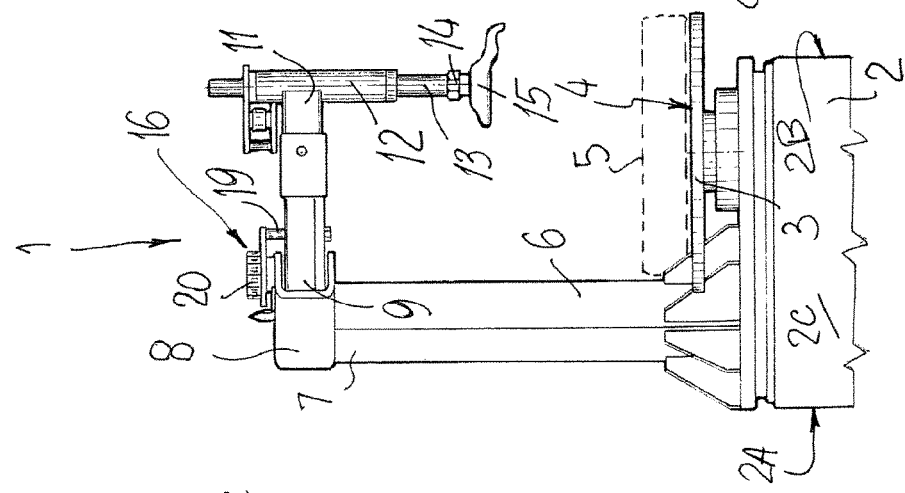
FIG. 2 is a top view of the tire changing machine of FIG. 1.
Figure 1:
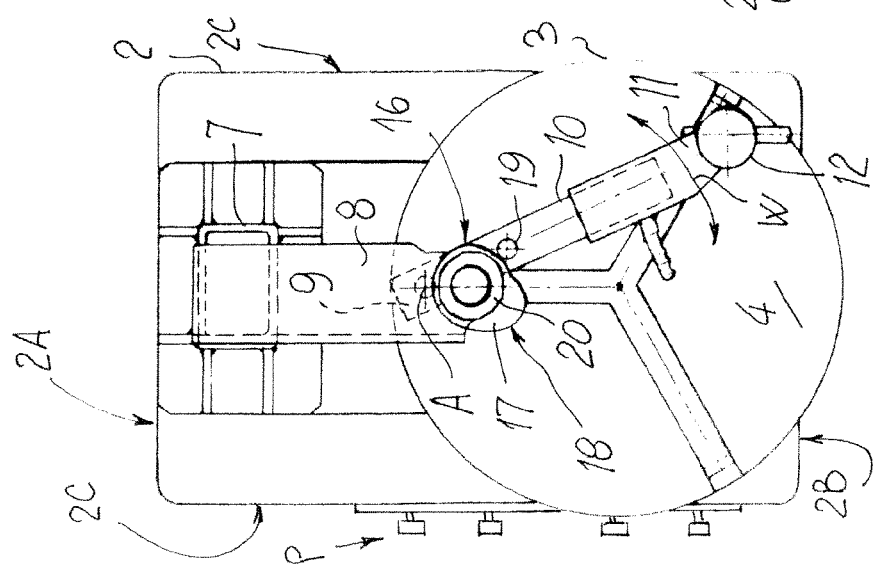
FIG. 1 is a lateral schematic broken-away view of a tire changing machine equipped with selector means for selecting an orientation of the operating arm.
Figure 8:
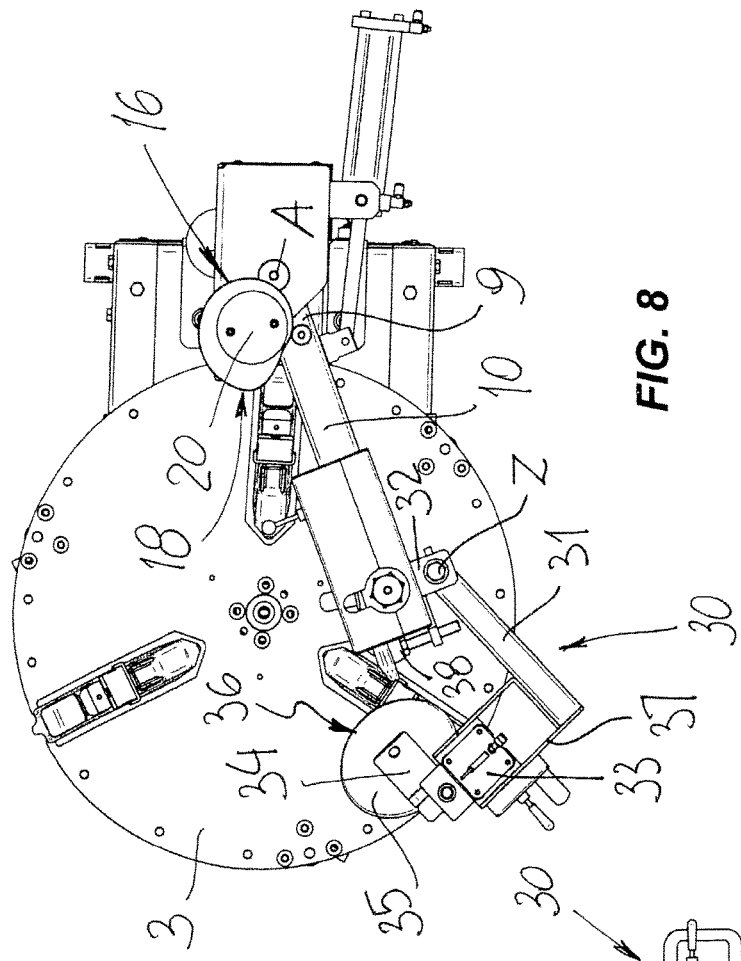
FIG. 8 is a top view of a tire changing machine in a more complete version, with an auxiliary bead pressing device.
Figure 9:
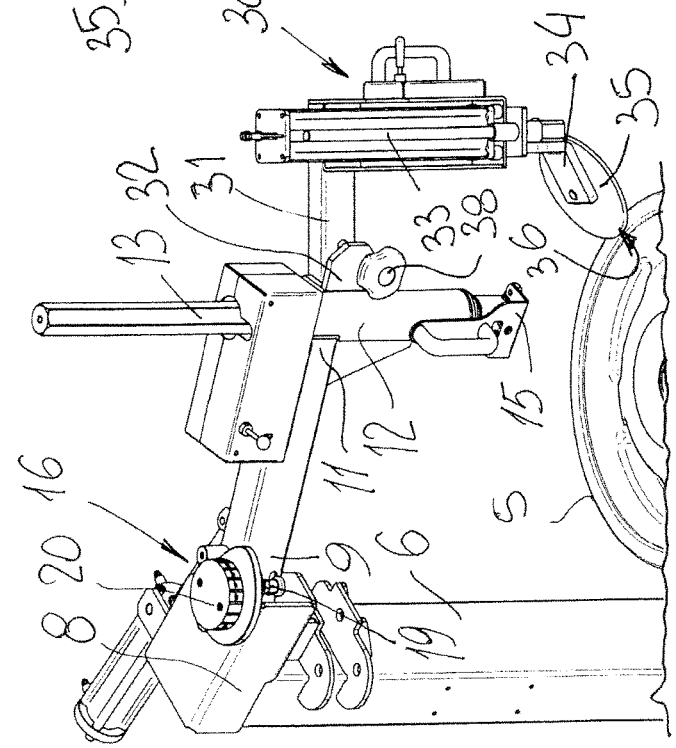
FIG. 9 is a partial perspective view of the tire changing machine of FIG. 8.

A plurality of holes 22, typically blind holes, are formed in the bottom face of the contact element 17, and each is vertically aligned with a corresponding face 21. The holes 22 are designed to engagingly receive a peg 23 that projects upwards from the top wing of the flange 8 and is designed to slide axially to be removed from or introduced into one of the holes 22 by means of an actuating knob 24. When the peg 23 fits in one of the holes 22, the rotation of the contact element 17 is prevented, and when the peg 23 is pulled out of the holes 22 it is allowed. Referring now to FIG. 7, it can be noted that the base 2 that substantially has the shape of a parallelepiped defines, in addition to the rear side 2A, an opposite front side 2B and two lateral sides 2C. All the pedals "P" for controlling the operating functions of the tire changing machine 1 are located on one of these lateral sides 2C, namely the left lateral side with respect to the front side 2B, such that when the tire repairer works in this lateral position, he/she has the column 6 on his/her left. Referring now to FIGS. 8 and 9 it can be noted that, in a more complete version of the tire changing machine 1, the operating arm 10 has been equipped with an auxiliary presser device, generally referenced 30, which is designed to press the beads of tires. The auxiliary presser device, hereinafter briefly referred as presser 30, comprises an arm segment 31, having one end hinged to the operating arm 10 by means of a support bracket 32 fixed thereto and adapted to pivot in cantilevered fashion relative to the operating arm 10 about the axis of rotation "Z". The opposite end of the arm segment 31 supports an actuating cylinder 33 in a vertically perpendicular orientation, which has a sliding stem with a connection 34 at its bottom end, for a presser disk 35, which is designed, during actuation of the actuating cylinder 33, to press the bead of a tire to push it toward the central channel of the rim on which it is mounted. As shown in the figures, the connection 34 is oblique relative to the actuating cylinder 33, whereby the presser disk 35 only opposes an outer arc 36 of its peripheral edge to the bead of a tire, namely an outer arc 36 that faces the platform 3.

An adjustment screw 38 is provided between the arm segment 31 and the support bracket 32, for adjusting the limit stop of the angular rotation of the arm segment 31, thereby forming an abutment for aligning the latter, according to the diameters of the rims 5.

The operation is as follows: when a tire repairer has to demount a tire from a wheel 5, he/she lays it on the platform 3 and secures it in the lying position. Now, the tire repairer stands before the lateral side 2C and the operating arm 10 is rotated in a rest position on the opposite side, i.e. is displaced from the platform 3 to afford unimpeded handling of the wheel 5 by the tire repairer for laying and securing it. Then, with prior knowledge of the diameter of the wheel 5, the tire repairer acts upon the knob 24 to disengage the peg 23 from one of the holes 22 in which it was previously engaged, thereby releasing the rotation off the contact element 17. Now the tire repairer grasps the knob 20 and turns it relative to the peg 23, through an angle indicated on one of the faces 21 and corresponding to the value of the diameter of the wheel 5. Thus, the cam profile 17 also rotates with the knob 20 and comes to a position of contact with the peg 19, thereby defining a selected point of contact. Then the tire repairer releases the knob 24 and the peg 23 engages again with one of the holes 22, corresponding to the value that has been selected on the knob 20. Now, the tire repairer can draw the operating arm toward him/her, by rotating it from the previous rest position to the work position toward the platform 3, until the peg 19 contacts the selected point of contact with the contact element 17 which acts as a limit stop for the rotation of the operating arm 10. In this position, the rod 12 is on the vertical of the predetermined contact point between the bead of the tire of the wheel 5 and the work tool 15, with the latter not contacting the edge of the rim. In this step, the tire repairer may also use a presser 30, when one is provided in the tire changing machine 1. While rotating the arm segment 31, the tire repairer places the presser disk 35 such that the edge arc 36 is vertically aligned with the bead of a tire, and then actuates the actuating cylinder 33 for the presser 30 to push the bead toward the central channel of the rim, thereby separating it from the outer edge thereof and providing the space required by the tire repairer to introduce the lifting lever and lift the tire beyond the rim edge, in an effortless manner. It shall be noted that the presser 30 may be also used during mounting of a tire to the rim, in which case the disk 35 may be used to push the tire bead and cause it to move past the edge of the rim and to fit into the inner channel thereof. Once the tire repairer has completed the procedures for demounting and/or mounting a tire, he/she lifts the rod 12 and the corresponding work tool 15 and rotates the operating arm 10 again into the rest position, thereby moving it away from him/her and from the platform 3. Thus, he/she will be able to remove the wheel 5 from the platform 3 and replace it with the next one for a new treatment. If the next wheel has the same diameter as the previous one, once it has been placed and secured on the platform 3, the tire repairer will rotate the operating arm 10 back to the work position, and the rotation of the operating arm 10 will stop in the same position as before, because the peg 19 abuts the profile 18 in the same point of contact. Thus, the work position of the operating arm 190 is stored for all the wheels 5 with the same characteristics, e.g. with the same diameter, and may be repetitively reached in an error-free manner. However, if the diameter of the next wheel 5 differs from that of the previous wheel, the tire repairer may operate as described above to change the angular position of the contact element 17 and hence of the cam profile 18 and define a new point of contact between the cam profile 18 and the peg 19, which is adjusted according to the new diameter of the wheel 5. In other words, the peg 19 acts as a limit stop for the angular rotation of the operating arm 10 whereas the rotation of the contact element 17 changes the angular position of the cam profile 18 and hence the selected contact point. Once the position of the contact element 17 is set, the operating arm 10 may be repeatedly moved toward the platform 3 until it reaches exactly the same work position for each wheel 5 having the same characteristics as the previous wheel.

The invention has been found to fulfill the intended objects.

The invention as conceived is susceptible to changes and variants within the inventive concept, and all the details may be replaced by other technically equivalent elements.

In its practical implementation, any material, shape and size may be used as needed, without departure from the scope as defined by the following claims.

The invention claimed is:

1. A tire changing machine comprising: a base inside which a control pedal system is fitted;
   a platform rotatably supported on said base and defining a work surface, on which wheels of vehicles are fixed;
   a column from said base; and
   a working arm hinged to an upper zone of said column by a hinge system and angularly turnable in a turn plane transversal to said column, between a work position facing said platform and an opposing resting position turned away from said platform, said working arm having a hinging end and an opposing end equipped with a lock member for locking a holding device of working tools,
   wherein, between said hinging end and said column, a selection group of an angular orientation of said working arm in said work position is interposed,
   wherein said hinge comprises a flange fixingly associated to said column and a pin hinge supported to said flange, perpendicular to said work surface and transversally engaged in said hinging end,
   wherein said selection group comprises:
   a contact element defining a perimeter shaped profile configured to be turned into selectable positions so as to define selectable contact points on said shaped profile: and
   a fixed stop element against said selectable contact points, configured to stop an angular orientation of said working arm with respect of said column in a work position corresponding to one selected contact point wherein said contact element comprises:
   a plate peripherally defining the perimeter shaped profile and rotatably mounted on said flange, parallel to said turn plane, around a rotation axis among angularly selected positions: and
   a rotation acting handle of said plate rotatably coupled to said plate, and
   wherein, between said contact element and said flange, removable blocking elements of said contact element in said angularly selected positions are interposed.

2. The tire changing machine as claimed in claim 1, wherein said removable blocking elements comprise a plurality of holes obtained in said plate and a pin movably mounted on said flange between an engaged position in a selected hole among said plurality of holes and a disengaged position out from said selected hole.

3. The tire changing machine as claimed in claim 1, wherein said turn plane and work surface are reciprocally parallel.

4. The tire changing machine as claimed in claim 1, wherein said pedal system is positioned on a side of said base opposing said resting position.

5. The tire changing machine as claimed in claim 1, wherein a pressing member configured to press on beads of a tire of vehicle wheels is associated to said working arm.

* * * * *